United States Patent [19]
Krengel et al.

[11] 3,805,439
[45] Apr. 23, 1974

[54] PLIABLE CONNECTORS

[75] Inventors: Donald A. Krengel, Roseville; Wilfred L. Ratte, Jr., White Bear Lake, both of Minn.

[73] Assignee: Water Gremlin Company, White Bear Lake, Minn.

[22] Filed: Sept. 16, 1971

[21] Appl. No.: 181,053

Related U.S. Application Data

[63] Continuation-in-part of Ser. No. 67,768, Aug. 28, 1970, abandoned.

[52] U.S. Cl. ............................................. 43/43.1
[51] Int. Cl. ............................................. A01k 95/00
[58] Field of Search ..... 43/43.1, 43.12, 17.2, 44.96, 43/44.97, 42.49, 44.83, 44.92, 44.95; 85/5; 24/236, 237, 230.5 TP, 73 P, 73 PF, 208 A

[56] References Cited
UNITED STATES PATENTS

| 205,402 | 6/1878 | Marcellus............. 24/230.5 TP UX |
| 211,408 | 1/1879 | Kampf................. 24/230.5 TP UX |
| 883,048 | 3/1908 | Pflueger................... 43/43.1 |
| 1,702,946 | 2/1929 | Powers et al............. 24/230.5 TP |
| 2,271,899 | 2/1942 | Miller................... 43/43.12 X |
| 3,029,486 | 4/1962 | Raymond................ 24/73 P UX |
| 3,093,027 | 6/1963 | Rapata...................... 85/5 R |
| 3,180,052 | 4/1965 | Malesko................ 43/44.97 X |
| 3,200,459 | 8/1965 | Hartman................. 43/44.83 X |
| 3,212,052 | 10/1965 | Johanson................. 85/5 R X |
| 3,227,992 | 1/1966 | Strong..................... 248/27 X |

FOREIGN PATENTS OR APPLICATIONS

| 1,000,998 | 10/1951 | France................ 43/43.1 |

Primary Examiner—Warner H. Camp
Attorney, Agent, or Firm—Jacobson and Johnson

[57] ABSTRACT

A self attachable connecting element molded from a pliable material such as alcon, the element having a collapsible portion at one end, and a fastening portion at the opposite end. The collapsible portion is pressure deformable and compresses radially inward as the connecting element is forced through a smaller hole in an object being connected thereto. Upon passing through the smaller hole, the collapsible portion expands radially outward to prevent its withdrawal from the hole.

2 Claims, 9 Drawing Figures

INVENTOR
DONALD A. KRENGEL
WILFRED L. RATTE

BY
ATTORNEYS

PLIABLE CONNECTORS

CROSS REFERENCE TO RELATED APPLICATIONS

This application is a continuation-in-part of our application Ser. No. 67,768 filed Aug. 28, 1970 and titled "Pliable Connectors" now abandoned.

BACKGROUND OF THE INVENTION

In the prior art there are two types of connectors for fastening objects such as sinkers, hooks and the like to fishing lines. In one type of prior art connector a wire is inserted through the object to be fastened, looped to form a circle, and twisted several times to secure it in place. This operation must be repeated for each loop and requires a complicated machine. Furthermore, besides being costly to produce, the finished product has several disadvantages. Sharp edges remain on such wire loop devices which tend to snag objects in the water and also cause damage to the fishing line. In addition, some of the metal used tends to corrode in water and is readily visible.

Another type of connector is shown and described in the co-pending application of Wilfred L. Ratte, Jr., Ser. No. 830,447, titled "Connectors" and filed June 4, 1969 now continuation Ser. No. 163,033 and assigned to the same assignee as the present invention. This improved connector involves the use of a plastic to form the connector instead of a metal wire. Several types of plastics are used in this connector including Celcon, nylon, glass reinforced nylon and Delryn. The invention uses plastic molded into a straight pin arrangement with a loop portion on one end. The loop may be closed or may be formed to be flexible, nearly closed loop which permits a snapping engagement with another connecting device. The straight portion of the connector is inserted through a hole in the object until it protrudes beyond the hole. The protruding end of the straight portion is melted by any suitable method, including chemical or ultrasonic means. When a plastic is heated, it melts and forms a ball larger than the diameter of the straight portion thus preventing withdrawal of the connector from the hole. Also, the metal melted ball takes the shape of a symmetric bearing surface so that the sinker connected to the object swivels about the pin. The symmetrical nylon bearing does not clog or jam up with sand and silt normally encountered under water. Because a plastic such as nylon or the like is relatively soft and pliable, this type of prior art invention is less likely to cause damage to connecting lines than wire type connectors. Also, because the connector is molded and has no sharp edges it thus is much less likely to snag obstructions in the water. Furthermore, the use of nylon for the other pliable plastic materials for the loop portion is advantageous as it is not abrasive to the nylon fish lines as some metal loops are. While the use of nylon for a head and bearing comprises an improvement over prior art connectors, the present invention comprises an improvement to the bearing surface used with the invention improvement described in the aforementioned Ratte application.

SUMMARY OF THE INVENTION

Briefly, the present invention comprises a pliable fastening device having a radially inwardly pressure deformable member located on one end for pressure-forcing through a smaller opening in an object which is to be fastened thereto. After passing through the object, the pressure deformable member expands radially outward to allow a shoulder on the member to engage the object and thus prevent the member from being extracted therefrom. To assist in forcing the deformable member through the smaller opening there is provided a conical or tapered guiding section on one end of the deformable member. Also located in the deformable member is a hollowed out section to allow the deformable member to collapse radially inward.

DESCRIPTION OF THE PREFERRED EMBODIMENT

Figure 2:
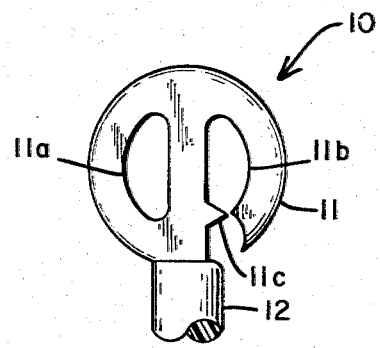
FIG. 2 shows an end view of the embodiment shown in FIG. 1.
Figure 2:
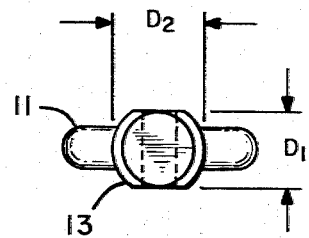
Figure 1:
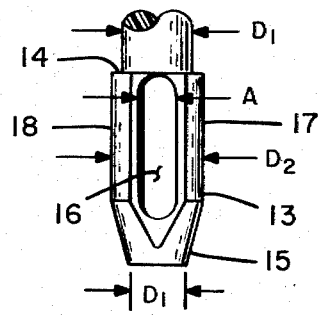
FIG. 1 shows a sectional view of one embodiment of our invention in which an eye and a snap are provided at one end of the connector.

Referring to FIG. 1, reference numeral 10 generally designates the preferred embodiment of our connector comprising a loop portion 11, a shank portion 12 and a collapsible section 13. Loop portion 11 comprises an eye 11a and a pliable snap 11b. Eye 11a can be used in the conventional manner to tie a line on to the connector 10. Snap 11b can be used by the operator to quickly fasten the connector to a swivel or the like. Located on loop portion 11 is a lip 11c that prevents the line from slipping past pliable snap 11b. With this type of arrangement of double eyes, the user can either tie the line securely to the connector or fasten it temporarily by slipping the line into snap 11b. Connector 10 can be formed from nylon, glass reinforced nylon, Celcon, or other suitable molded plastic materials having good strength characteristics and relatively good pliability. Collapsible section 13 includes a retaining shoulder or bearing surface 14 and a guiding surface 15 which is shown as frusto conical in FIG. 1. The diameter of shank 12 is designated by $D_1$ as is the end section of guiding surface 15. The maximum cross sectional dimension of collapsible section 13 is designated as $D_2$ and the opening in the center of collapsible section is denoted by reference character A. The minimum outside dimension of section 13 is designated by $D_1$ in FIG. 2.

Located within collapsible section 13 is an opening 16. Opening 16 allows side wall sections 17 and 18 to collapse radially inward. With side wall sections 17 and 18 in an inward position, it reduces the maximum cross-sectional dimension of collapsible section 13 to less than the minimum dimension of the opening in an object. This allows collapsible section 13 to pass through a nondeformable or nonexpandable opening such as opening 20 located in lead sinker 21. Opening 20 in lead sinker 21 has a diameter $D_3$ and a larger opening 22 having a diameter $D_4$. On the top side of opening 22 is a shoulder 24 that forms rotatable bearing engagement with shoulder 14 of collapsible section 13.

Figure 3:
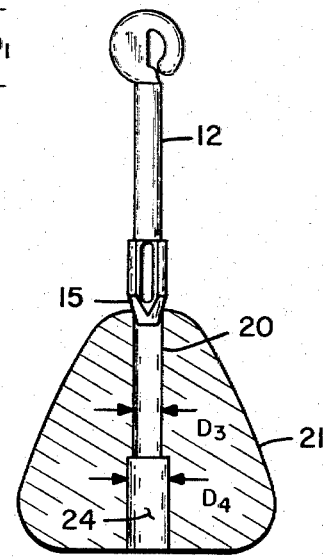
FIG. 3 shows the first step in inserting the connector into an opening in a sinker.
Figure 4:
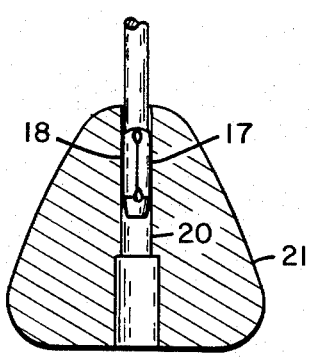
FIG. 4 shows a subsequent step with a connector partially inserted within a sinker.
Figure 5:
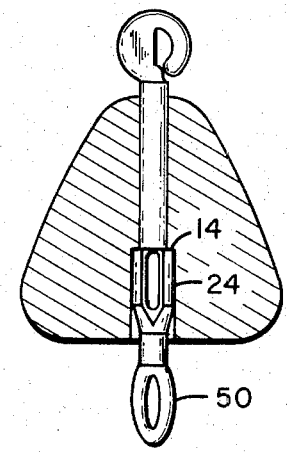
FIG. 5 shows a fully assembled sinker showing a different embodiment of our invention.

FIG. 3, FIG. 4 and FIG. 5, respectively, show deformable section 13 in the various sequential stages of assembly into a sinker 21.

In the first stage of assembly the tapered or guiding section 15 is inserted into opening 20 on the top of sinker 21. After inserting end portion of collapsible section 13, one forces connector downward to cause the collapsible side walls 17 and 18 to flex inward. This allows section 13 to slide within the opening 20 in sinker 21. FIG. 4 shows collapsible section 13 in its collapsed state.

FIG. 5 shows the connector in the final assembled state. In the final assembled stage collapsible section 13 has returned to its expanded state. With section 13 expanded radially outward, shoulder 14 can abut against shoulder 24 of lead sinker 21. Because of the relatively square shoulders on sinker 21 and collapsible section 13, connector 10 cannot be readily pulled out of sinker 21.

For purposes of illustrating another embodiment of our invention, FIG. 5 is shown with a second loop 50 located on collapsible section 13. Loop 50 is a pliable loop that can also be compressed radially inward to pass through opening 20 in sinker 21.

Figure 6:
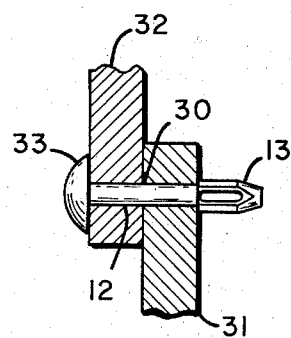
FIG. 6 shows another embodiment of our invention for holding two materials together.

In FIG. 6 our pliable attachment device 30 is shown holding two sheets of material 31 and 32 in contact with one another. The embodiment shown in FIG. 6 comprises a head 33, a conventional shank 12 and the aforedescribed collapsible section 13. However, instead of a looped portion on the shank 12, head 33 comprises a hemispherical head 33 that forms an abutting relationship against one face of object 32. The flat base of hemispherical head 33 and shoulder 14 of resilient collapsible section 13 coact to tightly hold members 31 and 32 together in a rivet-like fashion. Thus, it can be appreciated that in holding small metal particles and the like, which have nondeformable openings, our fastening device has application also.

Figure 7:
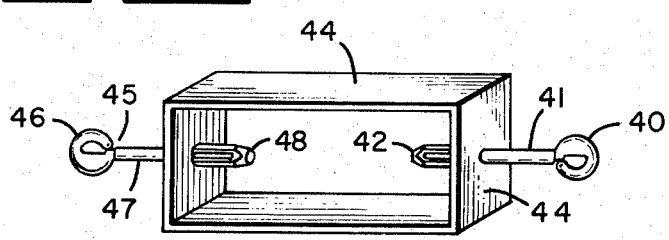
FIG. 7 shows a swivel made from the connectors shown in FIG. 1.

FIG. 7 illustrates another use of our invention. Two loop portions, such as shown in FIG. 1, are connected together to provide a swivel connector for fishing tackle. Loop 40 has a shank portion 41 and a collapsible section 42 that is positioned substantially perpendicular to the end section of body member 44. A second connector 45 having a looped portion 46, a shank 47 and a collapsible section 48 is located in a similar relation on the opposite end of body member 44. The coacting of body member 44 and connectors provide a swivel having complete freedom to rotate along the longitudinal axis of shank 41 and 45.

Figure 8:
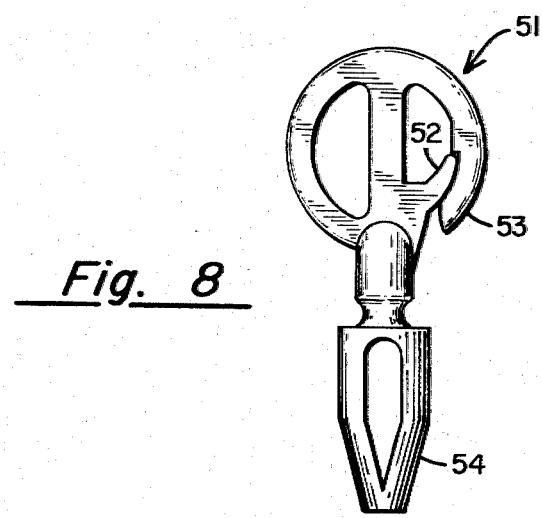
FIG. 8 shows another embodiment of the plastic eye and shank.
Figure 9:
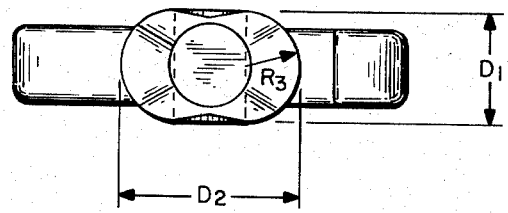
FIG. 9 shows an enlarged end view of the plastic shank.

FIG. 8 illustrates an improved connector 51 in which the eye is provided with a first lip 52 that partially overlaps a second lip 53. This type of overlapping lip greatly reduces the possibility of the line accidentally slipping out of the eye and also facilitates fastening the line to the eye.

One of the features of this type of sinker is that the sinker is free to rotate about the shank which enables the connector to also be used in swivels such as shown in FIG. 7. This feature also allows the sinker to roll along the bottom of the lake as the fisherman pulls in his line.

One of the features of our connector is the ability to assemble the connector into a lead weight with a minimum of force yet the extraction of the connector from the lead weight cannot be accomplished without a great deal of force. For example, the amount of force required to insert the connector into the sinker is approximately 1 ½ pounds while the force to separate the connector from the sinker is on the order of 12 pounds. Thus, it requires 8 times as much force to remove the connector as to assemble it. The low assembly force needed to insert the connector into the lead weight enables the connector and weight to be machine assembled without bending or breaking off the connectors thus greatly reducing the cost.

In order to automatically assemble the connector and weight, the dimension $D_1$ of the small portion of the shank is 0.090 inch and the largest dimension $D_2$ of the collapsible section is 0.125 inch. In order to accommodate the collapsible section, the opening in the sinker $D_3$ is 0.105 inch and the opening $D_4$ for the larger portion is 0.130 inch. With these typical relative dimensions and with the collapsible section having a radius of curvature $R_3$, which is equal to or less than the radius of curvature of opening $D_3$, the connector can be quickly and easily inserted into the sinker by machine. While applicants do not want to be bound by the dimensions, it should be pointed out that to automatically assemble the connector into the lead weight, it is necessary to have a clearance on the order of a few thousandths of an inch. This clearance enables the collapsible section to collapse with a minimum of force yet it prevents the connector from being extracted from the lead weight. Also, the same radius of curvature on the collapsible section and the minimum opening in the lead weight allows the collapsible section to fit into the opening in the lead weight.

We claim:

1. A sinker for fishing comprising: a lead weight, said lead weight having a flattened, egg-shape with a nonexpanding cylindrical opening therein, the nonexpanding cylindrical opening having a first opening of dimension $D_3$ and a radius of curvature $R_3$ and a second opening of dimension $D_4$, the dimension $D_4$ being greater than the dimension $D_3$, a pliable body member for collapsibly inserting into the nonexpanding opening in said lead weight, said pliable body member having a first end and a second end;

a head for engaging a fishing line or the like located on said first end of said body member; said head for engaging a fishing line comprising a first closed fishing line attachment member integrally formed with said body member and a second open fishing line attachment member integrally formed with said body member, said open second fishing line attachment member having a looped portion for receiving a fishing line; said looped portion including a first lip and a second lip, said first lip overlapping said second lip to thereby reduce the possibility of a fishing line accidentally slipping out of said looped portion and to also facilitate fastening the fishing line to said looped portion; said looped portion being integral with and reinforced by said first closed fishing line attachment member;

a resilient collapsible section located on said second end of said body member, said resilient collapsible section having a one way action so that the force of removing said collapsible section from the nonexpanding opening is approximately 8 times as much as the force to insert the collapsible section into the nonexpanding opening;

said collapsible section comprising parallel surfaces located on opposite sides of said collapsible section and a retaining shoulder for retaining said lead weight on said body member and thereby preventing the lead weight from sliding off said body member, said retaining shoulder forming substantially a flat area of contact with the surface of the lead weight to thereby prevent said shoulder from guiding said collapsible section out of the nonexpanding opening in said lead weight, said shoulder forming a rotatable support for said lead weight to thereby allow said lead weight to rotate on said shoulder; a pair of legs, said pair of legs in said collapsible section collapsible inward to allow said collapsible section to pass through said nonexpanding opening in said lead weight, the resiliency of said collapsible section operable to cause said collapsible section to expand to form locking engagement between said shoulder and said lead weight, said pair of legs integrally joined to said shoulder and to each other to provide a guiding surface, said guiding surface comprising a tapered section to guide the collapsible section into said nonexpanding cylindrical opening in said lead weight, said guiding surface operable to enable said collapsible section to be forcibly collapsed when said collapsible section contacts said nonexpanding opening in said lead weight, said guiding surface having a minimum dimension $D_1$ for insertion into said nonexpandable first opening of dimension $D_3$, said dimension $D_3$ being larger than said dimension $D_1$, said collapsible section having a maximum dimension $D_2$ that is larger than said dimension $D_3$ when said collapsible section is in a noncollapsed condition but having a dimension less than $D_3$ when said collapsible section is deformed radially inward to allow insertion of said collapsible section into the nonexpanding opening in said lead weight.

2. A sinker for fishing comprising a lead weight having a nondeformable opening therein, a pliable body member for collapsibly inserting into said nondeformable opening in said lead weight, said pliable body member having a first end and a second end;

a head for engaging a fishing line or the like located on said first end of said body member; said head comprising at least two members for attaching a line thereto with at least one member comprising an eye for fastening a line thereto with a portion of said eye forming a portion of reinforcement for said second member, said second member forming a hook for attachment to a fishing line;

a resilient collapsible section having parallel surfaces located on opposite sides of said collapsible section located on said second end of said body member; said resilient collapsible section having a one way action so that the force of removing said collapsible section from said nondeformable opening is approximately 8 times as much force as the force to insert the collapsible section into said nondeformable opening;

said collapsible section comprising a retaining shoulder for retaining said lead weight on said body member and thereby preventing said lead weight from sliding off said body member, said retaining shoulder forming substantially a flat area of contact with a surface of said lead weight to thereby prevent said shoulder from guiding said collapsible section out of said nondeformable opening in said lead weight when there is a pulling force on said collapsible section, said shoulder forming a rotatable support for said lead weight to thereby allow said lead weight to rotate on said shoulder, a pair of legs integrally joined to said shoulder and to each other to provide a guiding surface having a tapered section, said guiding surface operable to enable said collapsible section to be forcibly collapsed when said collapsible section contacts said nondeformable opening in said lead weight, said pair of legs in said collapsible section being collapsible inward to allow said collapsible section to pass through said nondeformable opening in said lead weight, said guiding surface having a minimum dimension $D_1$ for insertion into said lead weight having said nondeformable opening of dimension $D_3$, said dimension $D_3$ being larger than said dimension $D_1$, said collapsible section having a maximum dimension $D_2$ that is larger than said dimension $D_3$ when said collapsible section is in a noncollapsed condition but having a dimension less than $D_3$ when said collapsible section is deformed radially inward to allow insertion of said collapsible section into said nondeformable opening in said lead weight, the resiliency of said collapsible section causing said collapsible section to expand to form locking engagement between said shoulder and said lead weight.

* * * * *